3,041,238
METHOD OF PREPARING ACTIVATED ATTAPULGITE
Aldo P. Allegrini, Westfield, N.J., assignor to Minerals & Chemicals Philipp Corporation, Menlo Park, N.J., a corporation of Maryland
No Drawing. Filed Aug. 6, 1958, Ser. No. 753,413
2 Claims. (Cl. 167—55)

The instant invention relates to the treatment of attapulgite and has for its object the provision of activated attapulgite particularly suitable for use in liquid internal therapeutic formulations, such as antacids and antidiarrhetics. The invention relates also to the novel attapulgite product provided by my method and to pharmaceutical formulations adapted for oral ingestion which include the novel attapulgite product. Although the novel activated attapulgite is particularly useful in aqueous medicinal formulae, it will be understood that it may be otherwise utilized, e.g., as anticaking agents for chemicals, fertilizers or other material which tend to cake or consolidate due to the effects of temperature, humidity and/or pressure.

It is well-known that certain kaolinitic clays when taken internally function to alleviate certain gastrointestinal disorders, probably by sorption of toxins, although other factors may be involved. In general, it may be said that the gastrointestinal disorders responsive to treatment with certain kaolinitic clays are characterized by the presence of diarrhea and usually associated symptoms. Further, it is known that not all kaolin clays are suitable and efficacious for the purpose and attention is directed to U.S. Dispensatory, 24th Edition, 1947, Lippincott Co., Philadelphia, Pennsylvania, pp. 606–608.

The fact that not all kaolin clays are suitable in combating gastrointestinal disorders is evidence that the desiderata of a suitable sorptive mineral, particularly a clay mineral, for the purpose above stated are complex. Some of the desiderata of a suitable mineral, in addition to the sorptivity requirement include: freedom from noxious impurities, ability to be incorporated in an adequate amount in a liquid vehicle without producing an unflowable or difficultly flowable consistency, capable of being suspended in a liquid vehicle so that a liquid formulation thereof does not settle to small volume of highly compacted material which is not readily dispersible.

Heretofore, a certain primary kaolinitic clay mined in England has been the principal clay accepted by the pharmaceutical industry for use in antidiarrhetics. Nevertheless, the ability of this kaolin clay to sorb toxins and the poor suspendibility of the material in aqueous media leaves much to be desired.

It has long been of interest to those concerned with the art to provide a clay, particularly a domestic clay, which would be at least equal to, and preferably substantially superior to kaolin clay in such internal therapeutic formulations.

The difficulty in finding a substitute for kaolin clay suitable for use in internal therapeutic formulations are many, although a large variety of clay species are known and available. This is because high sorptivity and ability to be incorporated in relatively high concentration in aqueous media without excessively bodying the composition are not possessed by available clays, modified or unmodified.

Furthermore, the aforementioned properties are, in general, mutually exclusive in that high sorptivity in minerals is usually associated with colloidal properties. However, hydrophilic colloids inherently body aqueous systems when dispersed therein. These facts are well-known to those skilled in the art. Although it might suggest itself to one skilled in the art that clay minerals of high native sorptivity could be modified to alter their rheological characteristic when suspended in water, the task is not simple in that, as mentioned hereinabove, such modification tends to impair the native sorptivity of the mineral.

It has been recently found that degritted finely divided activated attapulgite, an acicular magnesium aluminosilicate clay mineral thermally treated to eliminate combined water, is vastly superior to kaolin in its ability to sorb bacteria and toxins such as *Staphylococcus aureus* and diphtheria toxin. These superiorities were still evidenced following washing of the kaolin and activated attapulgite with gastric juice as well as with acid. Further, activated attapulgite has the ability to neutralize over a wide range of acidities, this suggesting its utility as an internal antacid as well as being a valuable component of an intestinal adsorbent. In this respect, too, activated attapulgite is vastly superior to kaolin.

One serious detriment to the use of activated attapulgite in aqueous internal therapeutic formations is that the viscosity of activated attapulgite heretofore available at efficacious concentrations is excessive, this indicating the presence of some colloidal particles. Most pharmaceutical suspensions contain additives such as alcohol, propylene glycol or other humectants, or salts. These additives ordinarily increase further the viscosity of the suspension and in no instances lower the viscosity. When a gum or inorganic colloidal substance such as alumina gel or colloidal aluminosilicate is used to keep the activated attapulgite in essentially permanent susepnsion, the consistency of the formulation is further increased thereby aggravating the problem. Ordinarily relatively concentrated attapulgite formulations are desired so that a unit volume represents a suitable dosage, typically from 10–25% by weight of the formulation.

The subject invention is a result of my discovery that by a strictly controlled combination of processing steps attapulgite unsuitable in its native state or as activated by prior art techniques for use in aqueous antidiarrhetic formulations, may be rendered superior to kaolin clay heretofore accepted for use. It will be recognized by those skilled in the art that by the provision of such a clay mineral a need long felt by the pharmaceutical industry has been satisfied; further, it will be recognized that the provision of a clay characterized by a high degree of sorptivity as well as by suitable rheological character when suspended in aqueous media is surprising in view of: (1) the known correlation between colloidality and gel-forming properties of clay minerals, and (2) the known tendency of attapulgite to exhibit materially decreased sorptive capacity when gel properties are virtually eliminated.

Briefly stated, in accordance with the present invention the clay mineral attapulgite in the form of relatively small uniformly sized particles is calcined under carefully controlled preselected conditions and thereafter subjected to extremely fine grinding, particularly by impingement of attapulgite particles against other attapulgite particles. The resultant novel form of attapulgite provided by my method is characterized by high sorptivity, relatively high settling volume after being suspended in water and ability to be dispersed in water at relatively high concentrations without contributing excessively to viscosity. Thus, I have succeeded in so modifying the lattice of attapulgite as to alter the rheology of dispersions of the mineral in aqueous systems, thereby rendering it eminently suitable for use in aqueous pharmaceutical formulations adapted for oral ingestion, without adversely affecting the sorptivity normally characteristic of the mineral.

I am well aware that attapulgite has been calcined to modify its properties, e.g., to reduce or eliminate substantially its gel-forming characteristics when dispersed in water or to otherwise desirably alter the characteristics of the mineral, thereby to render it suitable for certain applications. Such treatment is conventionally termed "activation" and is described in detail in an article entitled "Thermal Activation of Attapulgus Clay," W. S. W. McCarter et al., Industrial & Engineering Chemistry, Vol. 42, page 529 (March 1952). Further, I am aware that activated attapulgite has been finely ground, e.g., to provide a material suitable for use as a conditioning agent for hygroscopic material. Attapulgite is the chief mineral constituent of Georgia-Florida or Attapulgus fuller's earth wherein it exists usually associated with various mineral impurities such as sepiolite, montmorillonite, quartz and feldspar. As mined the mineral is associated with substantial water, both loosely held or "free-moisture" and chemically combined water which is an integral part of the crystal lattice. Typically the earth as mined contains about 50%, by weight total water. About 11.2% of the volatile-free weight of the earth weight is combined water which is less readily removed than the physcially held water and ordinarily requires a temperature of at least about 600° F. for at least partial removal, this being called "activation." Volatile-free (V.F.) weight is the weight of the earth after heating to essentially constant weight at about 1800° F. Removal of combined water is substantially irreversible whereas physical water loss is reversible.

The term "volatile matter" or V.M. as used herein refers to the weight percent of the mineral eliminated when heated to constant weight at about 1800° F. In general, it may be said that attapulgite calcined to a V.M. content of 10% or less is activated and has at least partial loss of colloidal properties. Since physically bonded water is picked up by the attapulgite after calcination the V.M. content of the calcined product as produced will be less than that of the same material after storage in humid environment or during handling.

The activation process of my invention differs from activation processes heretofore practiced in at least two important respects. Firstly, the attapulgite, in my process, is activated in the form of relatively fine particles whereas prior art techniques have employed coarser particles. Secondly, it is essential in my process that the finely divided material which is to be activated be provided as particles of relatively uniform particle size distribution since a suitable product is not otherwise realized.

The net effect of the processing differences hereinabove described is that my attapulgite differs materially from attapulgite heretofore activated, even activated and then fluid energy milled. As evidence of these differences is the material differences in physical characteristics of my product as compared to prior art activated attapulgite. Specifically, my attapulgite possesses the high sorptivity normally characterisitic of nonactivated attapulgite coupled with the loss of gel-forming properties which is normally characteristic of attapulgite activated under rigorous conditions. Further, although my attapulgite product is highly activated in that a very substantial portion of the lattice bound or combined water is eliminated, nevertheless, the product after being suspended in water does not settle to a small volume in dense compacted material, such as is characteristic of attapulgite otherwise processed to remove a like amount of lattice bound water. To the contrary, my product is characterized by settling to relatively large volume after being suspended in water and is readily resuspended after settling.

It will be understood that the term "sorptivity" as used herein refers particularly to sorptivity of a material towards methylene blue. The correlation between the capacity of a mineral to sorb methylene blue is recognized generally in the pharmaceutical industry to be correlated with the ability of the mineral to function effectively in sorbing large molecules such as toxins usually associated with certain gastrointestinal disorders. A suitable mineral for pharmaceutical formulations has a methylene blue adsorption value (by a method hereinafter described) of at least 85%.

More specifically in accordance with a preferred embodiment of my invention I crush raw attapulgite to provide particles typically smaller than one inch. Any suitable crusher may be employed although I prefer to hammer mill the raw clay and then pass the hammer milled product into a smooth roll crusher. The crushed product is then calcined at a temperature between about 250–1000° F. and to a V.M. content between the range of from about 0–35%. The calcination conditions, in this step of my process, are not critical since the purpose of this initial calcination is to harden the raw attapulgite sufficiently to permit its grinding into substantially uniform particles, preferably ¼" or smaller. I have obained good results using a direct fired rotary calciner having a discharge temperature of 450° F. wherein the V.M. of the calcined material (as produced) is about 11%. The calcinate is then milled, suitably in a corrugated roll mill to a particle size of −4 mesh to +100 mesh and preferably about −8 mesh to +42 mesh.

It will be understood, however, that this initial calcination step may be eliminated if the crushed raw attapulgite is screened and only the fraction about ¼" or finer is subjected to a single controlled calcination step hereinafter to be described. When the latter method is followed, crushing is preferably by closed circuit whereby material coarser than ¼" will be recycled to the crusher. However, it will be readily apparent that the embodiment of my invention involving calcination prior to grinding will be preferable both from the standpoint of efficient plant operation and from the standpoint of the ultimate product obtained since more uniform particle size is realized when grinding a calcined product.

The crushed relatively uniformly sized attapulgite obtained by the above or equivalent methods is then calcined at a temperature ordinarily within a range between about 900–1200° F., and more usually 1000–1100° F. and for a time to reduce the V.M. content to 0 to 4%, and preferably from 1 to 3%. Ordinarily a residence period of about ½ to 1 hour in the calciner will be required. It will be understood that the optimum calcination conditions will vary somewhat for attapulgites of different origin and are best derived by routine investigation. When calcination is conducted at too low a temperature virtual elimination of gel-forming properties of the attapulgite is not realized. When calcination is conducted at higher temperatures than herein specified sorptivity is diminished. As a result of the calcination essentially all of the free moisture and a substantial portion of the combined water is eliminated. As has been hereinabove stated, the combined water content of raw attapulgite is about 11.2% based on the volatile-free weight of the clay. After calcination in accordance with my procedure at least about 70% of the original combined water content of the attapulgite clay is eliminated.

Since, by my method, calcination has been applied to small uniform particles the presence of colloidal particles which would otherwise be present in the calcined material is avoided. I have observed that a sample of coarse particles of attapulgite intermixed with fine particles thereof can be calcined to a V.M. of less than 3%; however, the calcined material will invariably comprise some fine particles having a V.M. substantially lower than 3% as well as coarse particles, portions of which have a V.M. of 10% or higher and are thus possessive of gel-forming properties.

The calcined material is cooled by any suitable means and then milled typically to a minimum of 90% minus 325 mesh. The milled product is then subjected to very fine grinding, preferably utilizing a fluid energy mill, to a fineness such that substantially all of the material is 20 micron or finer and at least about 50% by weight is finer than 5 micron. In a fluid energy mill, particles of attapulgite conveyed in a high velocity elastic fluid impinge against one another. Particle size, as referred to herein refers to such sizes as are measured by the well-known Casagrande hydrometer method, using, however, 1.8 as the value for particle density.

The product of the invention is powder which can be suspended in water or aqueous media at high concentrations, such as 25% by weight, without altering significantly the viscosity of the water or aqueous media. For example, the typical Brookfield Helipath viscosity (10 r.p.m.) is within the range of from 0–50 centipoises.

Pharmaceutical formulations adapted for internal ingestion may be prepared simply by suspending a suitable amount of the novel activated attapulgite in water, preferably using about 10–25% by weight of attapulgite. Ordinarily, other therapeutic agents will be used in combination with the activated attapulgite, e.g., antibiotics, bismuth salts such as bismuth subnitrate and bismuth subgallate. A small quantity of a pectic substance may be used in combination with the attapulgite, as desired. One important application of the product involves the conjoint use of a hydrophilic inorganic colloid, such as for example, colloidal alumina or a colloidal aluminum silicate. Such an inorganic colloid when dispersed in water bodies the water and maintains the activated attapulgite in suspension. Therapeutic value has been imputed to such hydrophilic colloids.

My invention will be more fully understood by a reading of the examples thereof which follow:

Example I (1a) Raw attapulgite (gray Attapulgus fuller's earth from the La Camelia mine in northern Florida) was selected for processing. The mined clay was crushed in a hammer mill and further crushed in a Jeffrey crusher. Samples of the crushed clay were dried at various temperatures in the neighborhood of about 450° F. for about one hour to a V.M. within the range of from about 10 to 12%. Each calcined product was ground to 8/42 mesh and then calcined at various temperatures between 990° F. and 1020° F., to an average V. M. of about 2.0, and cooled in a cascade cooler. The various products were combined and milled in a Raymond mill to a fineness of 90% by weight finer than 325 mesh and fluid energy milled at 700 pounds an hour throughput using hot compressed air (95 p.s.i.g. at receiver, heated to 750° F.). The particle size distribution of the fluid energy milled product was 0% +325 mesh, 95% −15 micron, 91% −10 micron and 68% −5 micron. The methylene blue absorption value was greater than 95%. The reading on the Brookfield Helipath viscometer (10 r.p.m.) of a 25% aqueous suspension was 0.5, corresponding to a viscosity of 0–50 cp.

(1b) This example illustrates the critical nature of temperature used in calcining small uniformly sized attapulgite aggregates. It was found that, utilizing the same clay, and processing this clay in accordance with the method of Example 1a, with the exception that the second calcination was conducted at temperatures below 900° F. (such as to reduce the V.M. to about 4.4% or more), the viscosity of a 25% aqueous suspension of the resultant product was excessive. In the case of attapulgite initially calcined at 450° F., screened to 8/42 mesh as in Example 1a, calcined at 800° F. to a V.M. of 4.4%, and fluid energy milled under conditions described in Example 1a, it was found that the Helipath viscosity was about 600 centipoises for a 10% aqueous suspension. The viscosity would be substantially higher for a 25% suspension. When the second calcination was at 600° F. (to a V.M. of 6.7%) the Helipath viscosity was 6100 centipoises for a 10% suspension.

Example II

This example sets forth the desirability of calcining small uniform particles of attapulgite to achieve the desired rheological properties. In this example the same clay as employed in Example I was used. However, the crushed feed to the calciner was not suitably sized prior to calcination inasmuch as it included substantial coarse lumps (i.e., +4 mesh material). The material was calcined at 1050° F. (to a V.M. of 2.2%) and the calcined product was sized. Each fraction was ground to −4 mesh in an Allis-Chalmers roller mill followed by pulverizing three times in a laboratory Raymond mill. The V.M. and Brookfield Helipath viscosity and Stormer viscosity of a 20% slurry of each fraction was measured and the results recorded below.

| Fraction | Percent | V.M., Percent | Visc. of 20% slurry | |
|---|---|---|---|---|
| | | | Brookfield Helipath, cp. | Stormer, ku. |
| +2 | 15 | 7.2 | 2,730 | 15 |
| 2/4 | 27 | 2.2 | 0–50 | 3 |
| −4 | 58 | 1.8 | 0–50 | 3 |

The results show that the coarse material, although calcined at 1050° F., had a substantially higher V.M. content than the finer material and had an unsuitable viscosity.

In the examples of my invention hereinabove described, viscosity values refer to Brookfield Helipath viscosity obtained using the $1^{29}\!/_{32}''$ crosspiece. In the preparation of the suspension the appropriate quantity of attapulgite was mixed in distilled water in a Waring Blendor for exactly 5 minutes at 10,000 r.p.m.; the resulting suspension was transferred to a 600 cc. beaker and cooled rapidly to 75–85° F., and preferably 78–82° F. The suspension was stirred with a spatula 25 times and the crosspiece immediately lowered ¼″ below the surface of the suspension. The viscosity reading was taken with the spindle speed set at 10 r.p.m.

Particle sizes were measured by TAPPI method T649 sm-54 (the Casagrande Hydrometer method) using 1.8 as the value of the particle density.

Methylene blue adsorption was determined by measuring the weight of methylene blue adsorbed by one gram of sample from a standard methylene blue solution. The procedure was as follows:

1.00 gram of attapulgite sample was transferred to a 100 ml. glass stoppered graduated cylinder containing 10 ml. of distilled water and 80.0 ml. of 0.1% methylene blue solution (1.000 gram of 100% dye in 1 liter of distilled water) was added thereto. The cylinder was stoppered and successively inverted and returned to upright position 50 times. The cylinder was then allowed to stand for 45 minutes and 10 ml. of 2% barium chloride was added. The cylinder was allowed to stand 15 minutes. 40 ml. of supernatant liquid was transferred to a 50 ml. centrifuge tube and centrifuged at a speed of about 2000 r.p.m. for 10 minutes. A 10 ml. aliquot of the clear supernatant liquid was transferred to a 200 ml. volumetric flask, diluted to volume and the optical density of the solution was determined using distilled water as the reference liquid at 665 mu. A standard curve was established by taking aliquots of 1.0, 2.0, 3.0 and 4.0 ml. of the methylene blue solution, transferring to 1000 ml. volumetric flasks, diluting to volume with distilled water and mixing thoroughly. The optical density of the standard solutions at 665 mu in the DU spectrophotometer was determined using distilled water as the reference liquid. The methylene blue adsorption value was calculated as follows:

$$A = 2\left[\frac{\text{Sample O.D.}}{\text{Std. O.D.}} \times \text{mg. Methylene blue in standard selected per liter}\right]$$

wherein $A$ = mg. Methylene blue in supernatant liquid $$\text{Percent adsorption capacity} = \left[\frac{80-A}{80} \times 100\right]$$

Example III

An aqueous suspension useful as in combating diarrhetic condition is prepared using, per fluid ounce, 6 grams of attapulgite (prepared in Example 1a) and 0.25 gram pectin.

Example IV

Another aqueous pharmaceutical suspension includes, per fluid ounce, 4 grams of attapulgite (prepared in Example 1a) suspended in alumina gel.

It will be understood that the term "substantially uniformly sized," as used hereinabove and in the claims, refers to particles from which both undesirable coarse and fine particles are absent. The term refers, more specifically, to material particles of which are substantially all within the range of —4 to +100 mesh and, particularly, to particles within the range of —8 to +42 mesh.

Further it will be understood that all concentrations of aqueous suspensions are expressed in terms of percentage of total weight of composition, i.e., a 25% concentration of activated attapulgite is made up by suspending 25 parts by weight of the attapugite in 75 parts by weight of water.

I claim:

1. The method for treating attapulgite to render said attapulgite suitable for use as an internal therapeutic agent when suspended in aqueous media which comprises the steps of crushing raw attapulgite, subjecting said raw attapulgite to a first calcination at a temperature of from about 250° F. to 1000° F. thereby to improve the grinding characteristics of said attapulgite, grinding the calcined attapulgite in a manner such as to provide aggregates of attapulgite of substantially uniform size not to exceed about 4 mesh, subjecting said substantially uniformly sized aggregates of attapulgite to a second calcination at a temperature within the range of from about 900 to 1200° F. and for a time sufficient to reduce the volatile matter of the calcined attapulgite to an amount not to exceed about 4% and thereafter fine grinding said calcined attapulgite to an extent sufficient to provide a powder substantially all of the particles of which have the sedimentation characteristics of particles 20 microns or finer.

2. The method for treating attapulgite to render said attapulgite suitable for use as an internal therapeutic agent when suspended in aqueous media which comprises the steps of crushing raw attapulgite, subjecting said raw attapulgite to a first calcination at a temperature from about 250° F. to 1000° F. thereby to improve the grinding characteristics of said attapulgite, grinding said calcined attapulgite in a manner such as to provide aggregates of substantially uniform size within the range of from about —8 to +42 mesh, subjecting said substantially uniformly sized aggregates of attapulgite to a second calcination at a temperature within the range of from about 1000–1100° F. and for a time sufficient to reduce the volatile matter of the calcined attapulgite to an amount within the range of from 1 to 3% and fine grinding said calcined attapulgite to an extent sufficient to provide a powder substantially all of the particles of which have the sedimentation characteristics of particles 20 microns or finer.

References Cited in the file of this patent

UNITED STATES PATENTS

| | | |
|---|---|---|
| 2,315,410 | Simons | Mar. 30, 1943 |
| 2,477,386 | McCarter | July 26, 1949 |
| 2,918,405 | Barr | Dec. 22, 1959 |

OTHER REFERENCES

McCarter: Ind. and Eng. Chem., Vol. 42, Jan.–Apr. 1940, pp. 529–533.

Chem. Abst., Vol. 45, 1951, page 4112a.